L. CHOUNARD.
GATE.
APPLICATION FILED MAR. 8, 1918.

1,329,263.

Patented Jan. 27, 1920.

Inventor
Leon Chounard,

By E. Hume Talbert
Attorney

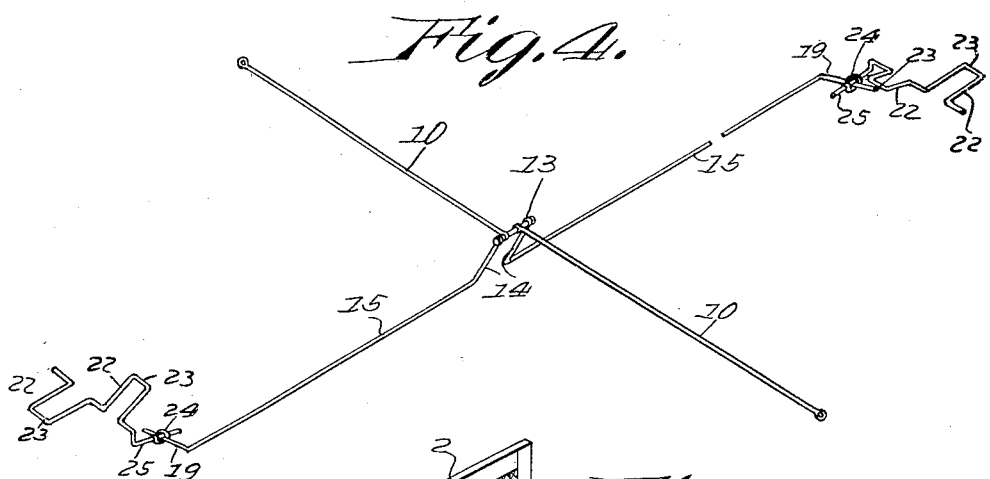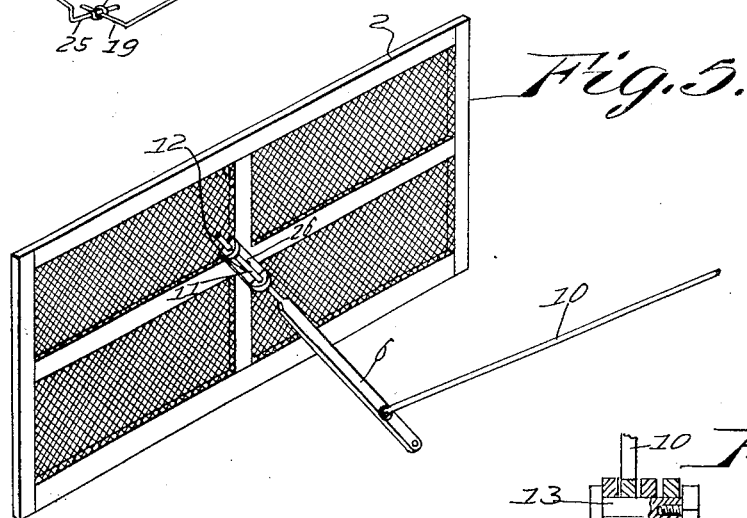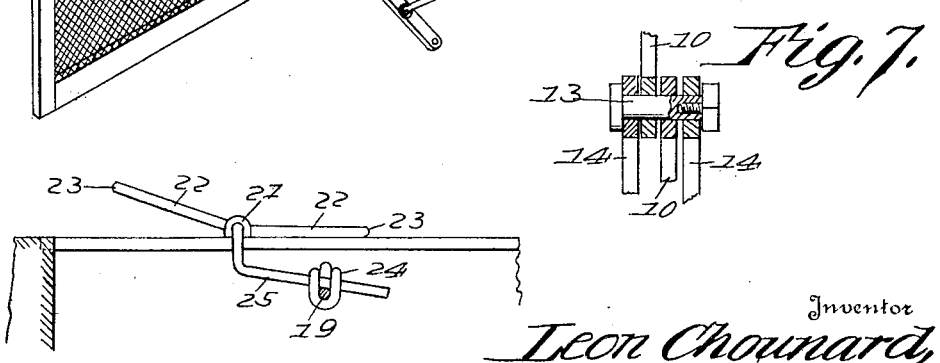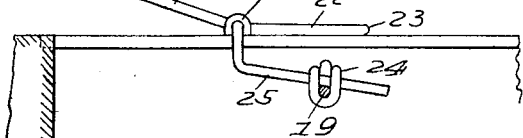

UNITED STATES PATENT OFFICE.

LEON CHOUNARD, OF VAWN, SASKATCHEWAN, CANADA.

GATE.

1,329,263.　　　　Specification of Letters Patent.　　Patented Jan. 27, 1920.

Application filed March 8, 1918. Serial No. 221,187.

*To all whom it may concern:*

Be it known that I, LEON CHOUNARD, a citizen of the United States, residing at Vawn, in the Province of Saskatchewan and Dominion of Canada, have invented new and useful Improvements in Gates, of which the following is a specification.

As an improvement in gate operating mechanisms, the invention seeks to provide, as its principal object, a gate opening and closing mechanism capable of being operated by the wheels of an approaching or departing vehicle.

An additional object is to provide an operating mechanism which may be installed below the surface of the road-way where it will be protected from injury and be prevented from presenting an ungainly appearance.

As still another object, the invention is designed to be simple in construction, effective in operation, and of such a character as to be easily and cheaply made.

Other and further objects will appear as the detailed description of the device progresses.

Though the invention is shown in but one of its embodiments, it is not to be understood as being restricted to this embodiment. The actual practical application of the device may show certain desirable changes or alterations to be advisable, and these the right is claimed to make, any of which are compatible in spirit with the appended claim.

In the accompanying drawings:—

Fig. 4 is a perspective view of that portion of the gate operating mechanism which is installed below the surface of the road-way.

Fig. 5 is a perspective view of one of the gates with its attendant opening and closing lever.

Fig. 6 is a section on the line 6—6 of Fig. 1.

Fig. 7 is a detail sectional view of the connection between the shifter rods and connecting rods.

Figure 1:
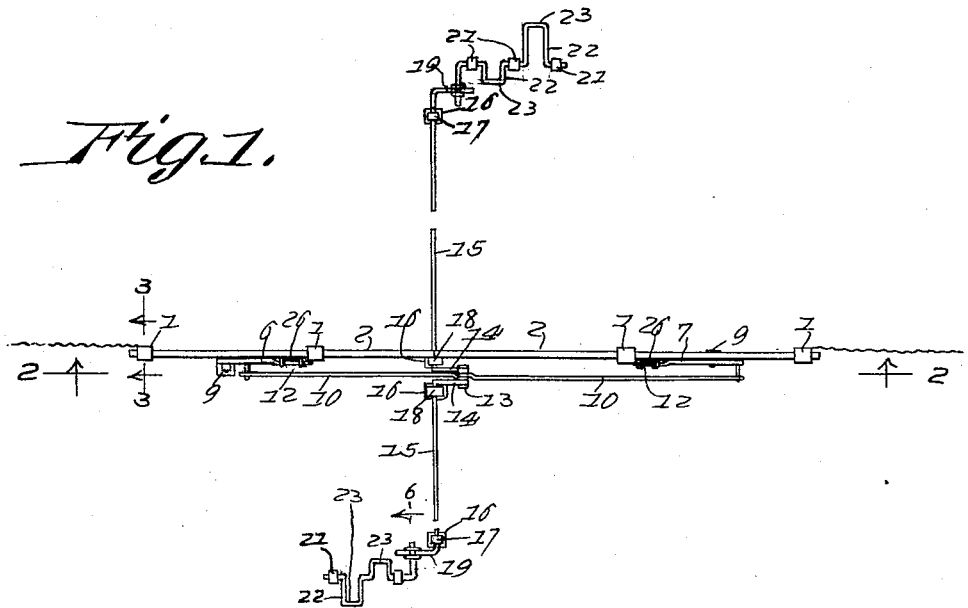
Figure 1 is a plan view of the invention.
Figure 2:
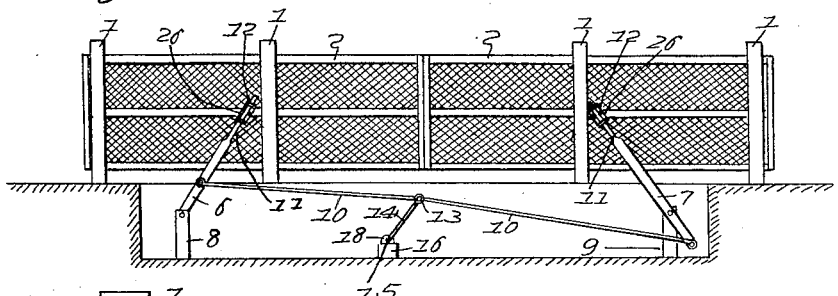
Fig. 2 is a section on the line 2—2 of Fig. 1.
Figure 3:
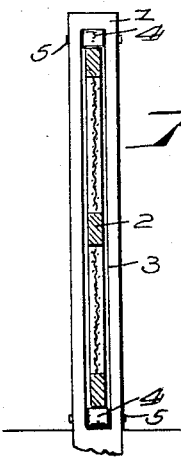
Fig. 3 is a section on the line 3—3 of Fig. 1.

Referring to the drawings, there are shown four posts 1 which are designed to be set in the ground and which are in alinement and in spaced relation to each other. The two central posts 1 are intended to define an opening for which the gates 2 are the closure members, these gates being slidably mounted in the posts and designed for longitudinal translational movement. The posts 1 are provided with longitudinal slots 3 which extend clear through the posts and carry both at their upper and lower ends the rollers 4 which are rotatably mounted on studs 5 inserted transversely through the posts. The gates 2 move through these slots 3, their bottom edges resting on the lower rollers 4, and their top edges engaging the upper rollers.

At approximately the center of the gates, the opening and closing levers are connected, the lever 6 being connected to one of the gates and the lever 7 to the other. At the end remote from that which connects with the gate, the lever 6 is pivotally connected at the top of a post 8 which is set in the ground. The lever 7 has a pivotal connection at the top of a post 9 also set in the ground, but this pivotal connection is not at the end of the lever, as is the case with lever 6, but is a specified distance from the end. Connecting rods 10 connect with both the levers 6 and 7, having a pivotal engagement with each, one connecting with the bottom end of the lever 7 and the other with the lever 6 at a specified distance from the bottom. This arrangement, it will be observed, results in moving the upper ends of the levers 6 and 7 toward each other or away from each other as a result of any longitudinal movement imparted in the same direction to the connecting rods 10. Since the upper ends of these levers are connected with the gates 2, any movement thereof will operate to move the gates toward or away from each other. The upper ends of both the levers 6 and 7 are provided with elongated holes 11 through which the pins 12 pass when effecting the attachment of the levers to the gates. Since the gates are designed to move horizontally and the levers define an arc in their movement, it is apparent that these elongated holes 11 are necessary to permit both the gates and the levers to perform their own peculiar movements.

The connecting rods 10 both have pivotal engagement with a stud 13 which secures together the free ends of the arms 14, bent at right angles to and made an integral part of the shifter rods 15. These shifter rods 15 are designed for pivotal movement and are supported on the posts 16 in such a manner as to make this pivotal movement possible, the bearings 17 and 18 supporting the rods and being suitably secured on top of the posts. It will be observed that the stud 13 practically unites the shifter rods into a unitary structure whose arms 14 abut the bearings 18 in such a manner as to preclude longitudinal movement of these shifter rods. At the ends remote from the arms 14, the shifter rods 15 are each provided with an arm 19.

Near the outermost posts 16 and set in a line at right angles to the rods 15, there is a pair of posts on either side of the gates. By means of bearings 21 which are suitably attached on top of these posts, the double-crank members 22 are supported. Each of these double-crank members is made from a single piece formed into two arms 23 each of which is in the shape of a U, the one being inverted with respect to the other. The arms 23 are angularly off-set with reference to each other, so that they do not lie in the same plane, thus when one is raised, the other is of necessity lowered. Those portions of the double-crank members 22 which are held in the bearings 21 and are in alinement with each other and the two arms are permitted to raise and lower, since the double-crank members are movably supported in the bearings 21. On the ends adjacent the ends of the shifter rods 15, the double-crank members 22 are formed with arms 25 which connect, by means of couplings 24, with the arms 19 and transmit to the shifter rods 15 any motion transmitted to the double-crank members.

It will be observed in the construction just described that any angular movement given to either of the double-crank members 22 will result in a correspondingly angular movement of the shifter rods 15 and their arms 14 which, connecting with the connecting rods 10, will impart a longitudinal movement to the latter, causing them to move both the levers 6 and 7 and to open or close the ends 2, as before described. It will be observed further that the angular movement imparted to the shifter rods 15 is designed to be obtained by the depression of either of the arms 23 of either of the double-crank members 22. Depressing one of the arms 23 will result in the angular movement of the shifter rods 15 in one direction; depressing the other arm will result in the angular movement of the shifter rods 15 in the other direction. It will be observed that the axes of the double crank members are at right angle to the axes of the shifter rods and that the arms 25 and 19 of the double crank members and shifter rods respectively cross each other. Couplings 24 providing for these arms are such that they may swing around one arm as they slide along the other. Thus a unique but simple connection between the double crank members and the shifter rods is provided.

The posts, 8, 9, 16 and the posts on which bearings 21 are supported are designed to be positioned below the surface of the roadway and the connecting rods 10, the shifter rods 15 and portions of the double-crank members 22 are also designed to be positioned below the surface of the road-way, the whole of this mechanism being covered by a suitable flooring, not shown. The arms 23 of the double-crank members 22 are designed to protect alternately above this flooring, a suitable opening space being provided therein to permit them to be projected therethrough or depressed thereinto. When the gates are in the closed position, one of the arms 23 of each of the double-crank members 22 projects out of the flooring. A team approaching the gate is so guided as to bring one of its front wheels into a position where it will move over the projecting arm 23, depressing it and causing an angular movement of that particular double-crank member 22, which imparts this movement thus received to the shifter rods 15, which in turn impart movement to the connecting rods 10, causing them to operate the levers 6 and 7 and to open the gates 2. The team may be then driven through the open gates and, when inside the gates, its wheels may be made to engage the then projecting arm 23 of the double-crank member on that side of the gates, causing a repetition of the same cycle of operations, which, however, are reversed in direction and result in the closing of the gates. It will be observed from the disclosure in the drawings that the depression of either of the arms 23, which results in the opening of the gates, will raise to an operative position those arms 23 by which the closing of the gates is effected.

What is claimed is:—

The combination with a slidably mounted gate, of an angularly movable shifter rod having an arm formed at one end and operatively connected with the gate at the other end, a double crank member consisting of two arms disposed at an angle to each other and mounted for rocking movement, the two arms having a common axis of movement, the double crank member being further provided with an angularly disposed arm, and a coupling connecting the last said arm with the arm of the shifter rod, the coupling being both angularly movable and longitudinally movable on both arms.

In testimony whereof I affix my signature.

LEON CHOUNARD.